(12) United States Patent
Kanai

(10) Patent No.: US 12,523,958 B2
(45) Date of Patent: Jan. 13, 2026

(54) IMAGE FORMING SYSTEM THAT FORMS ADJUSTMENT PATTERN FOR ADJUSTING IMAGE FORMING CONDITION

(71) Applicant: CANON KABUSHIKI KAISHA, Tokyo (JP)

(72) Inventor: Natsumi Kanai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/771,864

(22) Filed: Jul. 12, 2024

(65) Prior Publication Data

US 2025/0021041 A1    Jan. 16, 2025

(30) Foreign Application Priority Data

Jul. 14, 2023 (JP) ................. 2023-116093

(51) Int. Cl.
*G03G 15/00* (2006.01)
*G06K 15/02* (2006.01)
*H04N 1/00* (2006.01)

(52) U.S. Cl.
CPC ..... *G03G 15/5016* (2013.01); *G03G 15/5062* (2013.01); *G06K 15/1872* (2013.01); *G06K 15/1882* (2013.01); *H04N 1/0044* (2013.01); *H04N 1/00795* (2013.01); *H04N 2201/0081* (2013.01)

(58) Field of Classification Search
CPC ........... G03G 15/5016; G03G 15/5062; G06K 15/1872; G06K 15/1882; H04N 1/0044; H04N 1/00795
See application file for complete search history.

(56) References Cited

U.S. PATENT DOCUMENTS

| 7,580,661 B2* | 8/2009 | Aikawa .............. G03G 15/0194 399/72 |
| 10,097,734 B2 | 10/2018 | Sakatani |
| 11,232,332 B2 | 1/2022 | Yokote |
| 11,953,852 B2 | 4/2024 | Makino et al. |
| 2010/0290800 A1* | 11/2010 | Akiyama ........... G03G 15/5058 399/66 |
| 2017/0041510 A1 | 2/2017 | Sakatani |
| 2021/0150290 A1 | 5/2021 | Yokote |
| 2022/0382203 A1 | 12/2022 | Makino et al. |

FOREIGN PATENT DOCUMENTS

| JP | 2017030288 A | 2/2017 |
| JP | 2021081623 A | 5/2021 |
| JP | 2022181006 A | 12/2022 |

* cited by examiner

Primary Examiner — Hoang X Ngo
(74) Attorney, Agent, or Firm — Canon U.S.A., Inc. IP Division

(57) ABSTRACT

An image forming system includes: an image forming unit configured to form an image on a sheet. The image forming unit forms a first image inside a trimming region of a sheet, and forms a second image and an adjustment pattern outside the trimming region of the sheet, the adjustment pattern being for adjusting an image forming condition. Execution of instructions causes one or more processors to adjust the image forming condition at a time of image formation by the image forming unit, and, in a case where a formation region of the second image and at least a part of a formation region of the adjustment pattern overlap, control a display to display information indicating that the formation region of the second image and the formation region of the adjustment pattern overlap.

16 Claims, 15 Drawing Sheets

IMAGE FORMING SYSTEM THAT FORMS ADJUSTMENT PATTERN FOR ADJUSTING IMAGE FORMING CONDITION

BACKGROUND

Field of the Disclosure

The present disclosure relates to an image forming system that forms an adjustment pattern for adjusting an image forming condition.

Description of the Related Art

US-2021-0150290 discloses that adjustment patterns for tone adjustment are formed in a peripheral region of a sheet (i.e., a margin region in which a user's image (hereinafter, a user image) is not formed), and an image forming condition is adjusted based on the result of reading of the adjustment patterns.

In a peripheral region of a sheet, a content image can be arranged by a user as a part of a user image. The content image can be an image that is intended to manage a printed material, such as a serial number, a one-dimensional barcode, a two-dimensional barcode, and the like. Alternatively, the content image can be an image that is used in a post-process, such as a trim mark indicating a trimming position in sheet trimming processing.

If such a content image is formed while overlapping the adjustment patterns, the accuracy of reading of the adjustment patterns becomes degraded, and an image forming condition cannot be set with high accuracy.

SUMMARY

According to an aspect of the present disclosure, an image forming system includes: an image forming unit configured to form an image on a sheet; a reader configured to optically read the sheet on which the image has been formed by the image forming unit, and output read image data indicating a read image; a display; at least one memory storing instructions; and one or more processors configured to execute the instructions. The image forming unit forms a first image based on image data inside a trimming region of the sheet, and forms a second image and an adjustment pattern outside the trimming region of the sheet, the adjustment pattern being for adjusting an image forming condition. Execution of the instructions causes the one or more processors to adjust the image forming condition at a time of image formation by the image forming unit, and, in a case where a formation region of the second image and at least a part of a formation region of the adjustment pattern overlap, control the display to display information indicating that the formation region of the second image and the formation region of the adjustment pattern overlap.

Further features of various embodiments will become apparent from the following description of exemplary embodiments with reference to the attached drawings.

DESCRIPTION OF THE EMBODIMENTS

Figure 1:
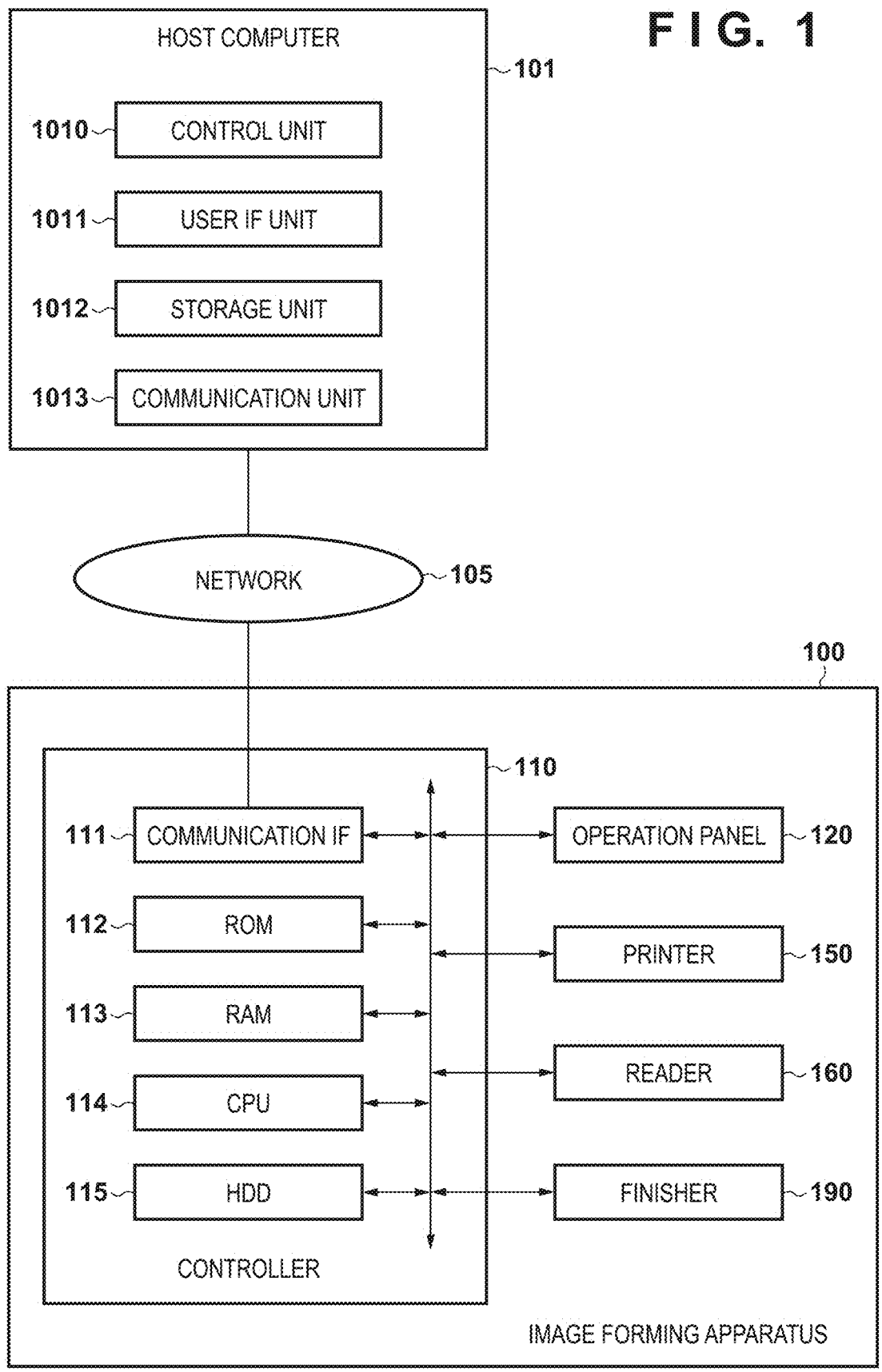
FIG. 1 is a configuration diagram of an image forming system according to some embodiments.

Hereinafter, embodiments will be described in detail with reference to the attached drawings. Note, the following embodiments are not intended to limit the scope of the claims. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

First Embodiment

FIG. 1 is a configuration diagram of an image forming system according to the present embodiment. The image forming system is also referenced as a printing system, and includes an image forming apparatus 100 and a host computer 101. The image forming apparatus 100 and the host computer 101 are connected via a network 105 in a communication-enabled manner. The network 105 is composed of, for example, a local area network (LAN), a wide area network (WAN), or the like. Although the image forming system of FIG. 1 is composed of one host computer 101 and one image forming apparatus 100, the image forming system can include a plurality of host computers 101 and a plurality of image forming apparatuses 100.

The host computer 101 is an information processing apparatus, and transmits a print job to the image forming apparatus 100 via the network 105. A storage unit 1012 of the host computer 101 stores data of a user image (including a content image), data of adjustment patterns used in the adjustment of an image forming condition, and a program executed by a control unit 1010. The control unit 1010 includes, for example, a processor, and controls the entirety of the host computer 101. A user interface (IF) unit 1011 includes a display as a display unit, and a keyboard, a mouse, and the like as input units, thereby providing a user interface. A communication unit 1013 executes communication processing via the network 105. For example, in a case where the control unit 1010 causes the image forming apparatus 100 to perform image formation that accompanies adjustment control based on adjustment patterns, it generates image data of an image that includes a user image and adjustment patterns, and transmits this image data to the image forming apparatus 100.

Upon receiving a print job from the host computer 101, the image forming apparatus 100 forms an image on a sheet in accordance with this print job. A controller 110 of the image forming apparatus 100 controls the entirety of the image forming apparatus 100. A central processing unit (CPU) 114 of the controller 110 controls the operations of each unit of the image forming apparatus 100 by executing a control program stored in a read-only memory (ROM) 112 or a hard disk drive (HDD) 115. When controlling the operations of each unit, the CPU 114 uses a random-access memory (RAM) 113 as a working area. A communication interface (IF) 111 executes communication processing via the network 105.

An operation panel 120 provides input interfaces and output interfaces for a user. The input interfaces are, for example, operation buttons, numeric keys, a touch panel, and the like. The output interfaces are, for example, a display, a speaker, and the like. The user can input a print job, a command, a print setting, and the like to the image forming apparatus 100 via the operation panel 120. The operation panel 120 displays a setting screen, a state of the image forming apparatus 100, and the like on the display.

A printer 150 generates a printed material by forming a user image on a sheet in accordance with an image forming condition based on image data included in a print job. As stated earlier, in the case of a print job that accompanies adjustment control, an image formed from the image data includes adjustment patterns. Therefore, in the case of a print job that accompanies adjustment control, the printer 150 forms a user image and adjustment patterns on a sheet. The image forming condition that is adjusted based on the adjustment patterns can be, for example, a condition related to the density of an image formed on a sheet, or a condition related to the position of an image formed on a sheet. A reader 160 is an image reading apparatus that optically reads the printed material generated by the printer 150, and transmits the reading result to the controller 110. A finisher 190 is a postprocessing apparatus that executes postprocessing such as trimming processing with respect to the printed material generated by the printer 150.

Figure 2:
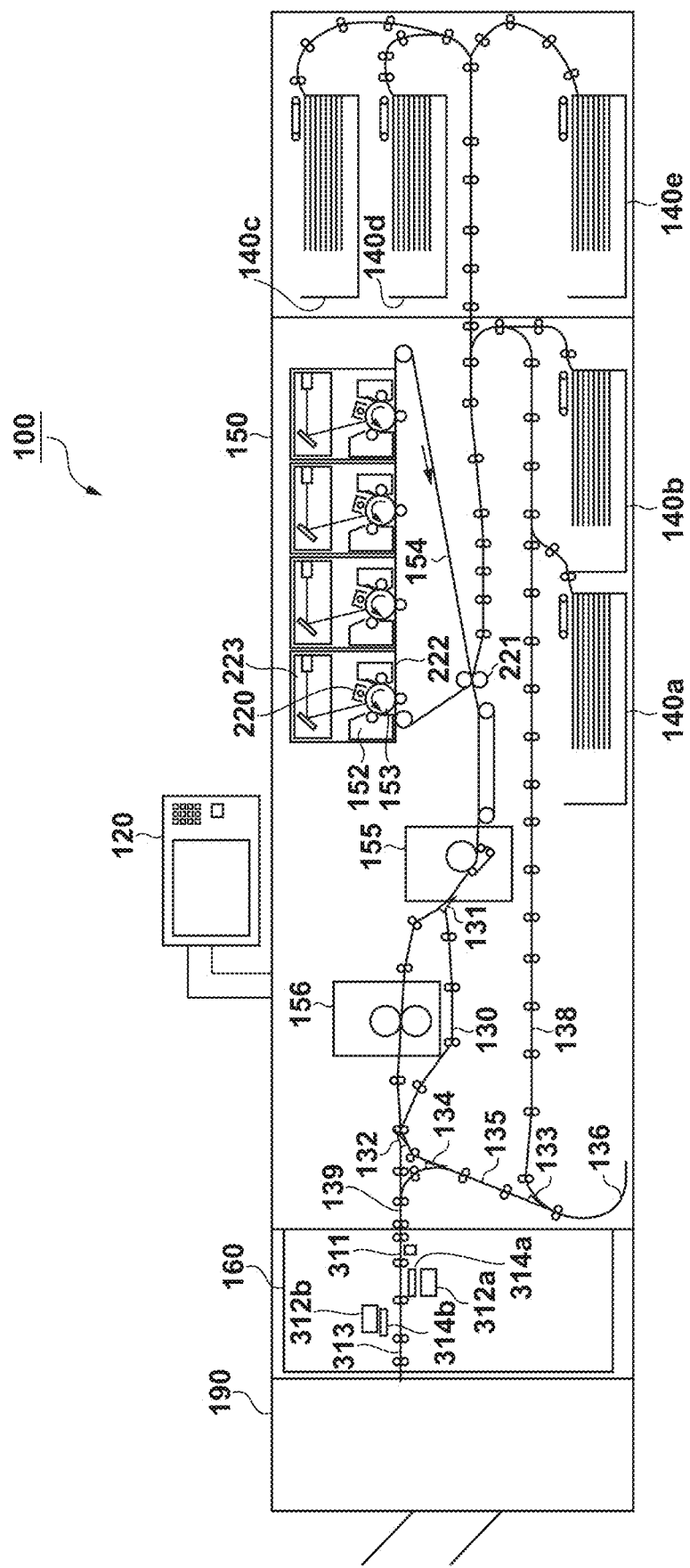
FIG. 2 is a configuration diagram of an image forming apparatus according to some embodiments.

FIG. 2 is a schematic cross-sectional diagram of the image forming apparatus 100. The printer 150 of the image forming apparatus 100 includes four image forming units 222 for forming yellow, magenta, cyan, and black images. Although the four image forming units 222 differ from one another in the color of a developer (toner) used in image formation, they have similar configurations. A photosensitive member 153 of an image forming unit 222 is driven to rotate in the counterclockwise direction of the figure during image formation. A charger 220 charges the rotating photosensitive member 153. An exposure device 223 exposes the photosensitive member 153 to light based on image data, thereby forming an electrostatic latent image on the photosensitive member 153. A developer 152 develops the electrostatic latent image on the photosensitive member 153 using toner, thereby forming an image (toner image) on the photosensitive member 153. The images formed on the photosensitive members 153 of the respective image forming units 222 are transferred to an intermediate transfer belt 154, which is driven to rotate in the clockwise direction of the figure. Colors different from yellow, magenta, cyan, and black can be reproduced by transferring the images formed on the photosensitive members 153 of the respective image form-ing units 222 to the intermediate transfer belt 154 in such a manner that the images overlap one another. As a result of the rotation of the intermediate transfer belt 154, the images transferred to the intermediate transfer belt 154 are conveyed to a position opposing a transfer roller 221. The transfer roller 221 transfers the images on the intermediate transfer belt 154 to a sheet which has been fed to a conveyance path in the image forming apparatus 100 from one of cassettes 140a to 140e and which has been conveyed along the conveyance path.

The printer 150 includes a first fixing device 155 and a second fixing device 156 that apply heat and pressure to the sheet to which the toner images have been transferred, thereby fixing the toner images on the sheet. The second fixing device 156 is located downstream relative to the first fixing device 155 in the sheet conveyance direction. The second fixing device 156 is used to increase the glossiness of the sheet that has passed through the first fixing device 155 relative to the images, and to ensure the fixing performance. The second fixing device 156 need not be used depending on the sheet type. In a case where the second fixing device 156 is not used, the sheet is conveyed on a conveyance path 130. A flapper 131 guides the sheet to the conveyance path 130 or the second fixing device 156.

The sheet that has passed through the second fixing device 156 or the conveyance path 130 is sent to a conveyance path 135 or a discharge path 139 by a flapper 132. For example, in a case where the images are formed only on one surface of the sheet and the sheet is discharged with an image forming surface thereof facing up, the sheet is sent to the discharge path 139. On the other hand, in a case where the images are formed only on one surface of the sheet and the sheet is discharged with the image forming surface thereof facing down, the sheet is guided to the conveyance path 135. Thereafter, the sheet conveyance direction is inverted, and the sheet is sent to the discharge path 139 by a flapper 134. Furthermore, in a case where the images are formed on both surfaces of the sheet, after the images have been formed on one surface of the sheet, the sheet is sent to an inverting unit 136 via the conveyance path 135. Thereafter, the sheet conveyance direction is inverted, and the sheet is sent to a conveyance path 138 by a flapper 133. The sheet that has been sent to the conveyance path 138 is conveyed to the position opposing the transfer roller 221 again, and images are formed on the other surface. Once the images have been formed on both surfaces of the sheet, the sheet is sent to the discharge path 139.

The sheet that has been sent to the discharge path 139 is conveyed to the reader 160. In the reader 160, the sheet is conveyed along a conveyance path 313. A line sensor unit 312a optically reads one surface of the sheet via a glass 314a. A line sensor unit 312b optically reads the other surface of the sheet via a glass 314b. A document detection sensor 311 is an optical sensor, and detects whether the sheet exists in a detection region on the conveyance path 313. The timing at which the document detection sensor 311 detected the sheet is used in, for example, determination of sheet reading timings of the line sensor units 312a and 312b.

The sheet that has passed through the reader 160 is conveyed to the finisher 190. Based on a print job, the finisher 190 executes various types of processing with respect to the sheet on which the images have been formed, that is to say, a printed material. The various types of processing include trimming processing for removing unnecessary portions of the printed material. The sheet that has passed through the finisher 190 is discharged to a discharge tray.

Figure 3:
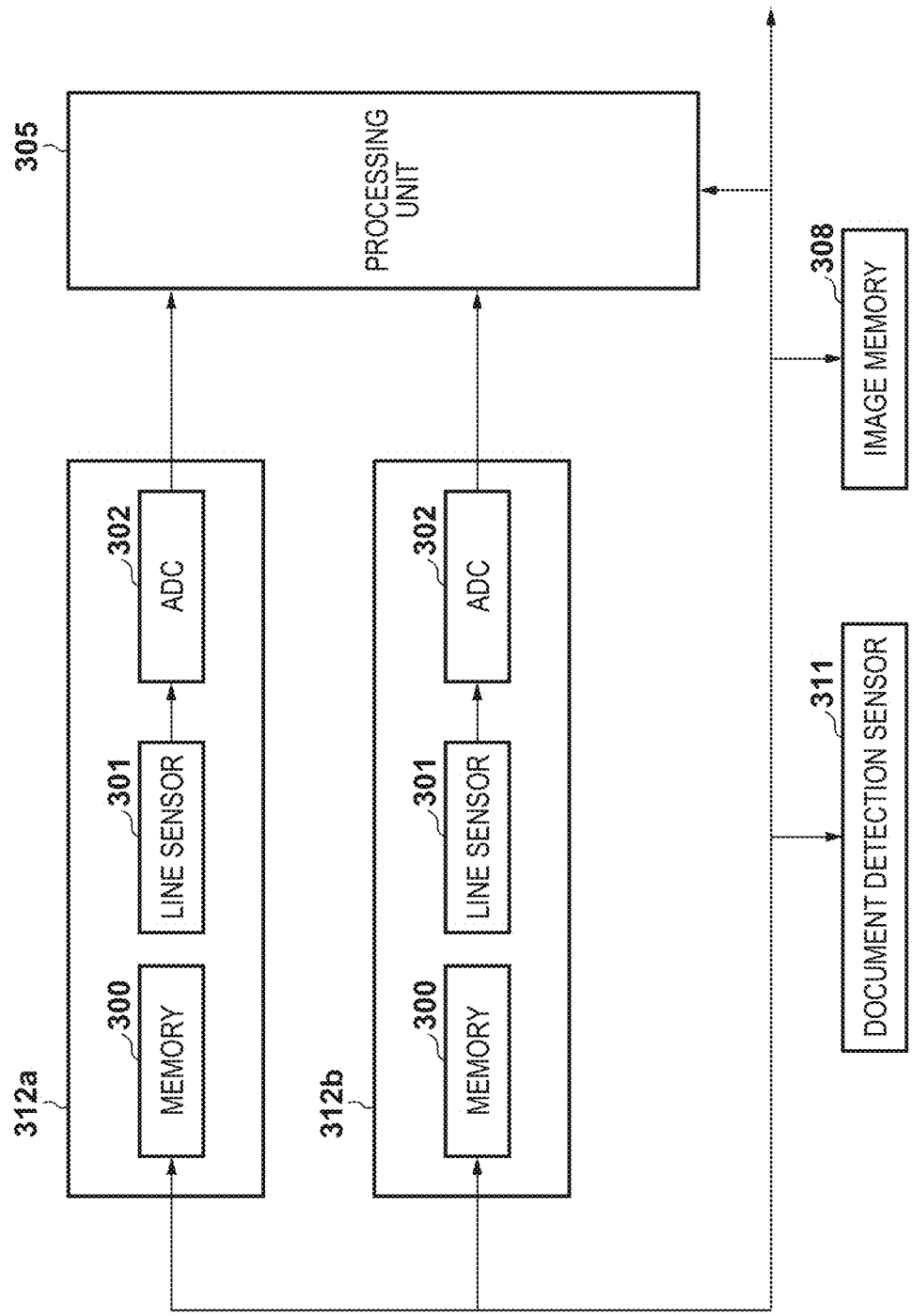
FIG. 3 is a configuration diagram of a reader according to some embodiments.

FIG. 3 is a configuration diagram of the reader 160 according to the present embodiment. The line sensor units 312a and 312b have similar configurations, and include a memory 300, a line sensor 301, and an analog-digital converter (ADC) 302.

Figure 4:
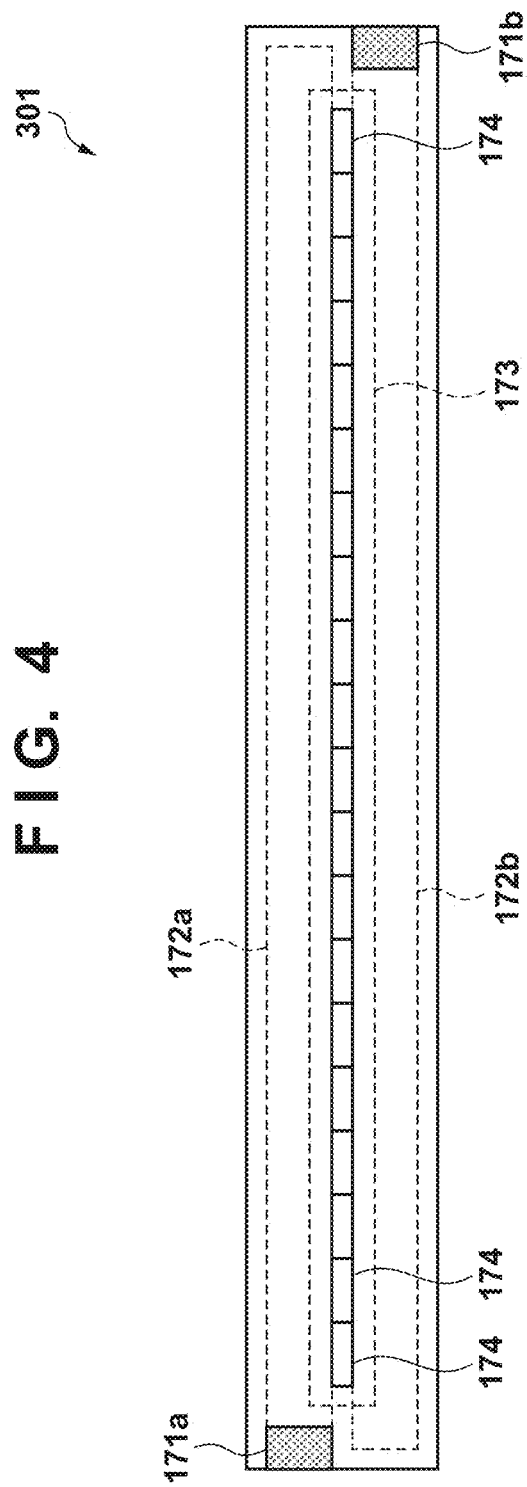
FIG. 4 is a configuration diagram of a line sensor according to some embodiments.

FIG. 4 is a schematic diagram showing an example of a configuration of the line sensor 301. According to FIG. 4, the line sensor 301 includes light sources 171a and 171b, light guiding members 172a and 172b, a lens array 173, and a plurality of sensor chips 174. The plurality of sensor chips 174 are arrayed along the main scanning direction. The main scanning direction is a direction that is perpendicular to the sheet conveyance direction. The light sources 171a and 171b are, for example, light-emitting diodes (LEDs) that emit white light. The light guiding member 172a directs light from the light source 171a toward a sheet while diffusing the light. The light guiding member 172b directs light from the light source 171b toward the sheet while diffusing the light. The light guiding members 172a and 172b have a linear optical path parallel to the main scanning direction, and irradiate the entirety of the sheet with white light in the main scanning direction. The lens array 173 forms an image of white light reflected by a surface of the sheet on a light receiving surface of each sensor chip 174. Each sensor chip 174 includes three rows of color filters corresponding to three color components of red (R), green (G), and blue (B), and three rows of photoelectric converters corresponding to them. Each photoelectric converter receives color component light that has passed through the corresponding color filter, and generates a corresponding electrical signal. As a result, the line sensor 301 outputs analog signals indicating an RGB image of each line that composes a read image of the sheet while the sheet is passing a read position.

Returning to FIG. 3, the memory 300 stores correction information for correcting variations in the characteristics of the discrete photoelectric converters in the line sensor 301. The ADC 302 converts the analog signals, which are the reading results of the line sensor 301, into digital signals and transmits the digital signals to a processing unit 305. The processing unit 305 determines adjustment patterns in the read image based on the digital signals indicating the read image (hereinafter, read image data), and outputs the result of detection of the adjustment patterns to the CPU 114. An exemplary configuration of the processing unit 305 will be described later. An image memory 308 is used by the processing unit 305 to temporarily store the read image data in processing thereof.

Figure 5:
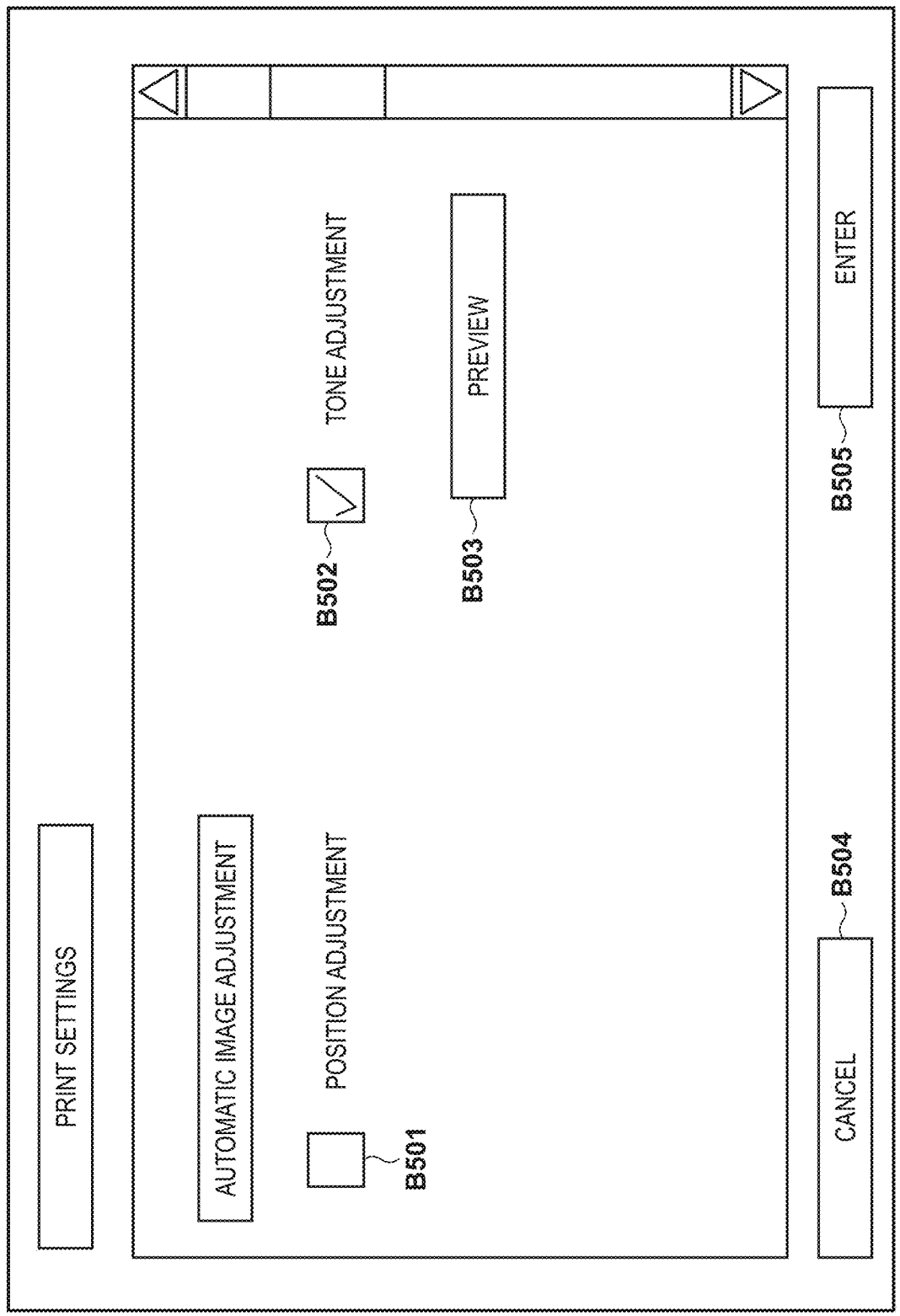
FIG. 5 is a diagram showing an example of a setting screen according to some embodiments.

FIG. 5 shows an example of a setting screen that is displayed by the control unit 1010 of the host computer 101 on the display, which is the display unit of the user IF unit 1011. The control unit 1010 transmits a print job to the image forming apparatus 100 in accordance with a print setting.

Using a checkbox B501, the user can input whether to execute position adjustment by forming adjustment patterns for adjusting the image position in predetermined regions of a sheet. Furthermore, using a checkbox B502, the user can input whether to execute tone adjustment by forming adjustment patterns for adjusting the image density (tone) in predetermined regions of a sheet. FIG. 5 shows a setting where only the tone adjustment is executed and the position adjustment is not executed.

In addition, the user can display a preview screen for confirming the formation positions of the adjustment patterns by pressing a preview button B503. Note that the preview button B503 can be configured to be enabled in the case of a setting where at least one of the position adjustment and the tone adjustment is executed. To enable the print setting configured on the setting screen of FIG. 5, the user presses an enter button B505; to cancel this print setting, the user presses a cancel button B504.

Figure 6:
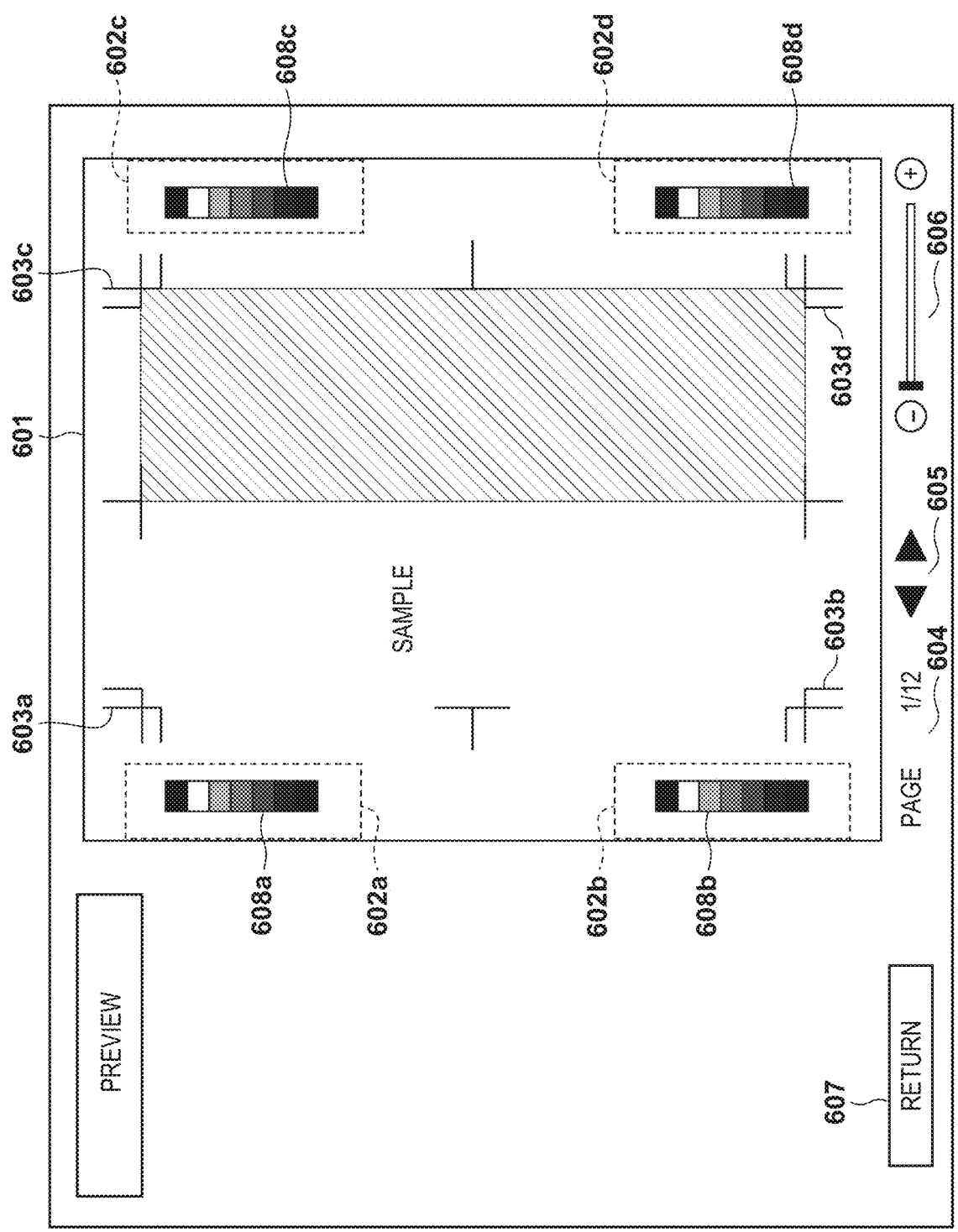
FIG. 6 is a diagram showing an example of a preview screen according to some embodiments.

FIG. 6 is an example of a preview screen that is displayed by the control unit 1010 on the display unit when the preview button B503 of FIG. 5 has been pressed while the setting for executing only the tone adjustment is configured. A preview display area 601 is an area for displaying a preview image of a pertinent page. The preview display area 601 displays both of adjustment patterns and a user image formed on a sheet. Note that as stated earlier, data of the adjustment patterns, that is to say, for example, data indicating the formation positions of the adjustment patterns and images of the adjustment patterns, is stored in the storage unit 1012.

According to FIG. 6, the user image includes content images 603a to 603d, which are images indicating trimming positions of the sheet. Note that the content images may be, for example, images that are intended for the user to manage a printed material, such as a one-dimensional barcode and a two-dimensional barcode. In the following description, the content images 603a to 603d are also collectively referred to as content images 603. Furthermore, according to FIG. 6, four adjustment patterns 608a to 608d are displayed. Each of the four adjustment patterns 608a to 608d is formed using yellow toner, magenta toner, cyan toner, and black toner, and includes a plurality of patch images with different tones. In the following description, the adjustment patterns 608a to 608d are also collectively referred to as adjustment patterns 608. A mask region, which is a blank region where no image is formed (printed), is set around the adjustment patterns 608 for the purpose of detecting the adjustment patterns 608 with high accuracy. Below, a region that includes an adjustment pattern 608 and a mask region around this adjustment pattern 608 will be referred to as a pattern formation region 602. As shown in FIG. 6, the control unit 1010 also displays border lines indicating the ranges of the pattern formation regions 602a to 602d that respectively correspond to the adjustment patterns 608a to 608d on the preview screen. Note that the data of the adjustment patterns stored in the storage unit 1012 of the control unit 1010 also includes information of the size of the pattern formation regions 602, the arrangement positions thereof on the sheet, and the like.

A page number object 604 allows the user to confirm the page number of the page that is displayed on the preview screen. Also, the user can change the page displayed in the preview display area 601 by operating page switching buttons 605. Furthermore, the user can enlarge or reduce the image displayed in the preview display area 601 by operating an enlargement/reduction object 606. Moreover, the user can return to the setting screen of FIG. 5 from the preview screen by operating a return button 607.

Figure 7:
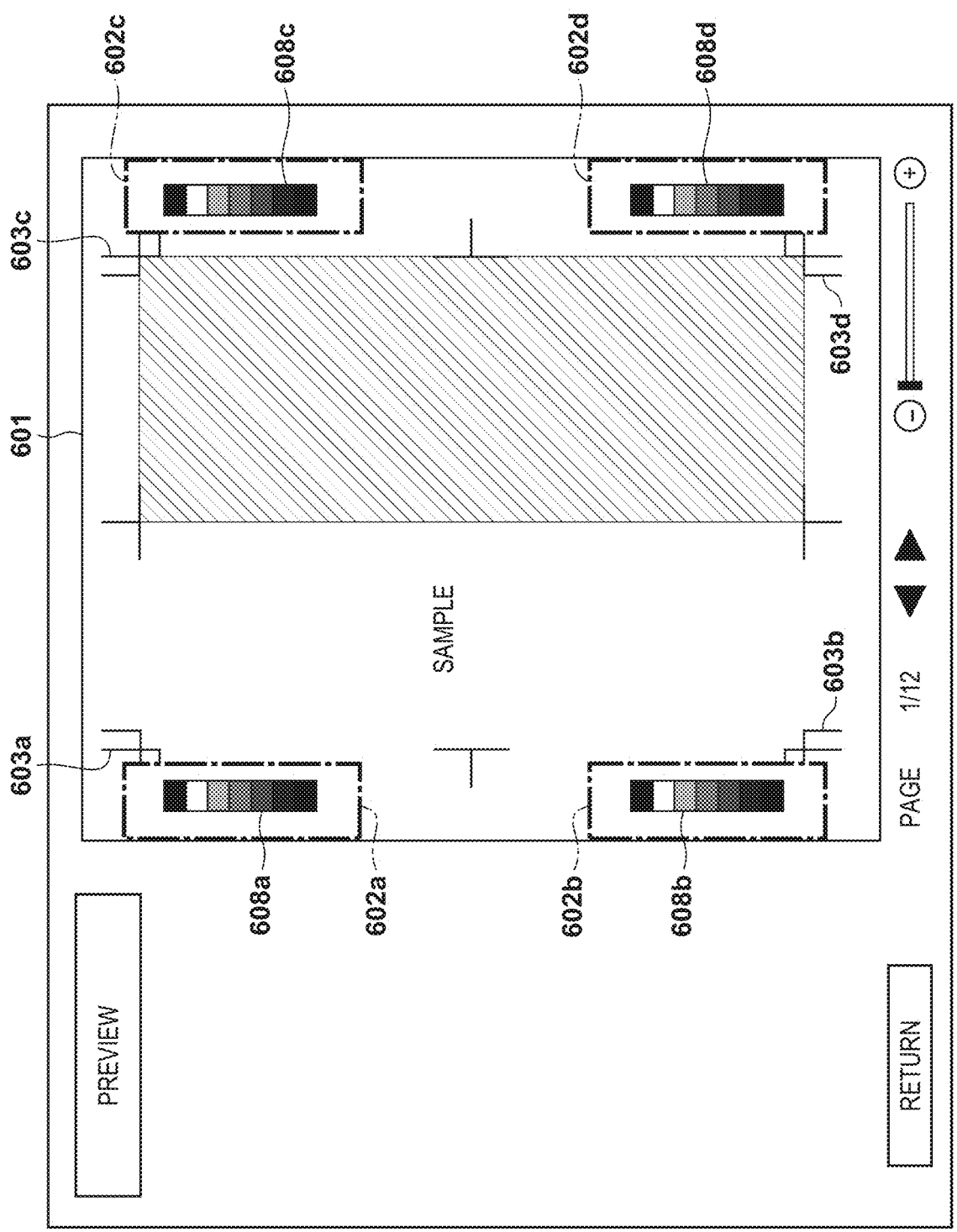
FIG. 7 is a diagram showing an example of a preview screen according to some embodiments.

FIG. 7 shows an example of a preview screen in the case of an overlapping state (a first state), in which at least a part of the content images 603 overlaps the pattern formation regions 602. Note that FIG. 6 shows an example of a preview screen in the case of a non-overlapping state (a second state), in which the content images 603 do not overlap the pattern formation regions 602. In the present embodiment, the control unit 1010 determines a sheet region in which the user image is formed based on image data for forming the user image, and determines whether the overlapping state is occurring by comparing the sheet region with the pattern formation regions 602. In the case of the overlapping state, the control unit 1010 causes the display mode of the pattern formation regions 602 on the preview screen to be different from that in the case of the non-overlapping state in order to cause the user to recognize the overlapping state. As one example, in the case of the overlapping state, the border lines are displayed with emphasis in such a manner that the display mode of the border lines indicating the pattern formation regions 602, such as the color, thickness, line type (solid line, dash line, dot line, etc.) and the like of the border lines, differ from the display mode in the case of the non-overlapping state, as shown in FIG. 7.

Figure 8:
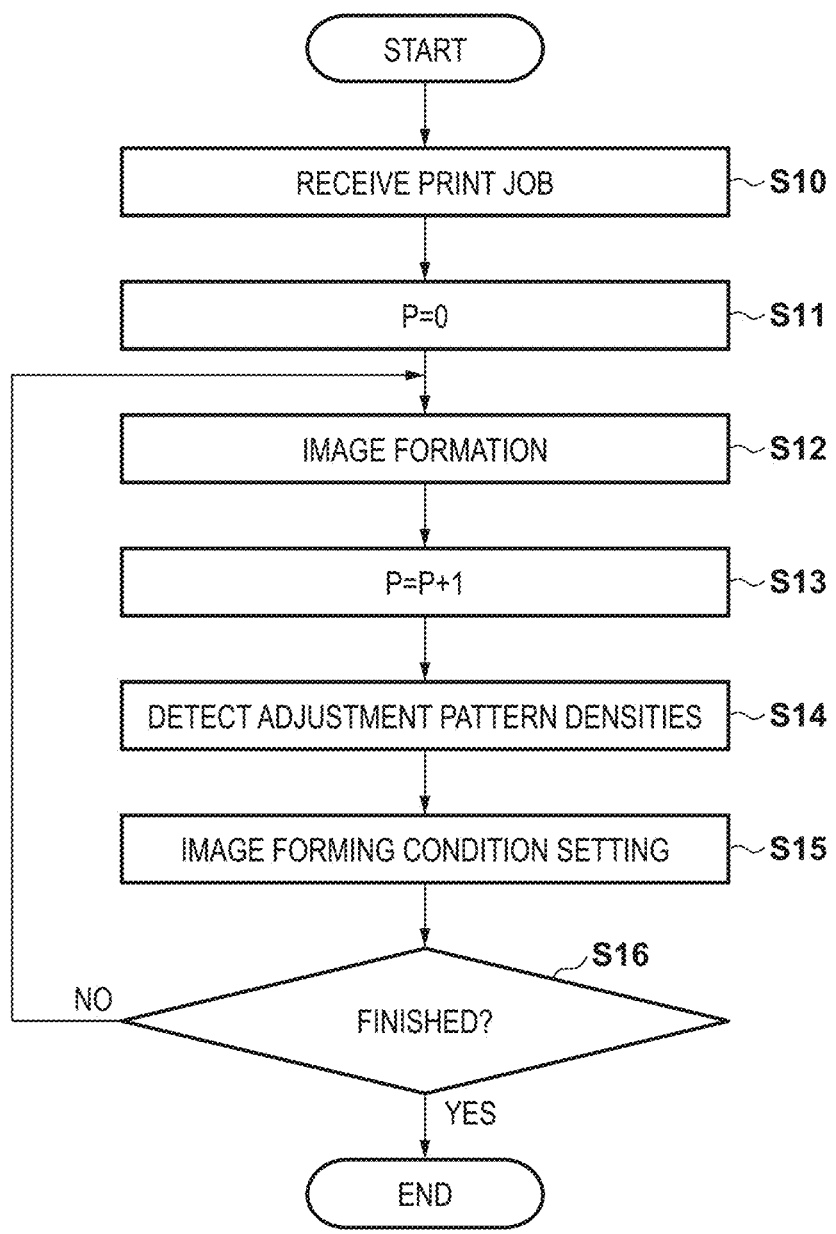
FIG. 8 is a flowchart of print processing according to some embodiments.

FIG. 8 is a flowchart of print processing that is executed by the controller 110 when a print job that accompanies adjustment control for adjusting tones has been received from the host computer 101. The user can transmit the print job to the image forming apparatus 100 by operating the host computer 101. The print job includes information indicating whether the adjustment control is to be executed, and in a case where the adjustment control is to be executed, information indicating the type of the adjustment control to be executed. Note that in a case where the adjustment control is to be executed, the host computer 101 transmits, to the image forming apparatus 100, image data for forming an image that includes a user image and adjustment patterns. In the flowchart of FIG. 8, it is assumed that tone adjustment control is to be executed. The user image includes information for printing content images. Upon receiving the print job from the host computer 101 in step S10, the controller 110 initializes a page counter P to 0 in step S11. In step S12, the controller 110 forms the user image and the adjustment patterns for tone adjustment on a sheet based on the print job. Once the images have been formed on the sheet, the controller 110 increases the value of the page counter P by one in step S13.

The sheet on which the images have been formed by the printer 150 is conveyed to the reader 160. The reader 160 reads the images on the sheet with use of the line sensor units 312a and 312b. Based on the result of reading of the adjustment patterns 608 obtained from the processing unit 305 of the reader 160, the controller 110 detects the densities of the respective patch images of the adjustment patterns 608 in step S14. In step S15, the controller 110 sets an image forming condition based on the detected densities of the respective patch images of the adjustment patterns 608 and the target densities of the respective patch images. The image forming condition is, for example, a lookup table (LUT) for Y correction. In step S16, the controller 110 determines whether every printing designated by the print job has finished. If every printing has not finished, the controller 110 repeats the processing from step S12. If every printing has finished, the controller 110 ends the processing of FIG. 8.

Figure 9:
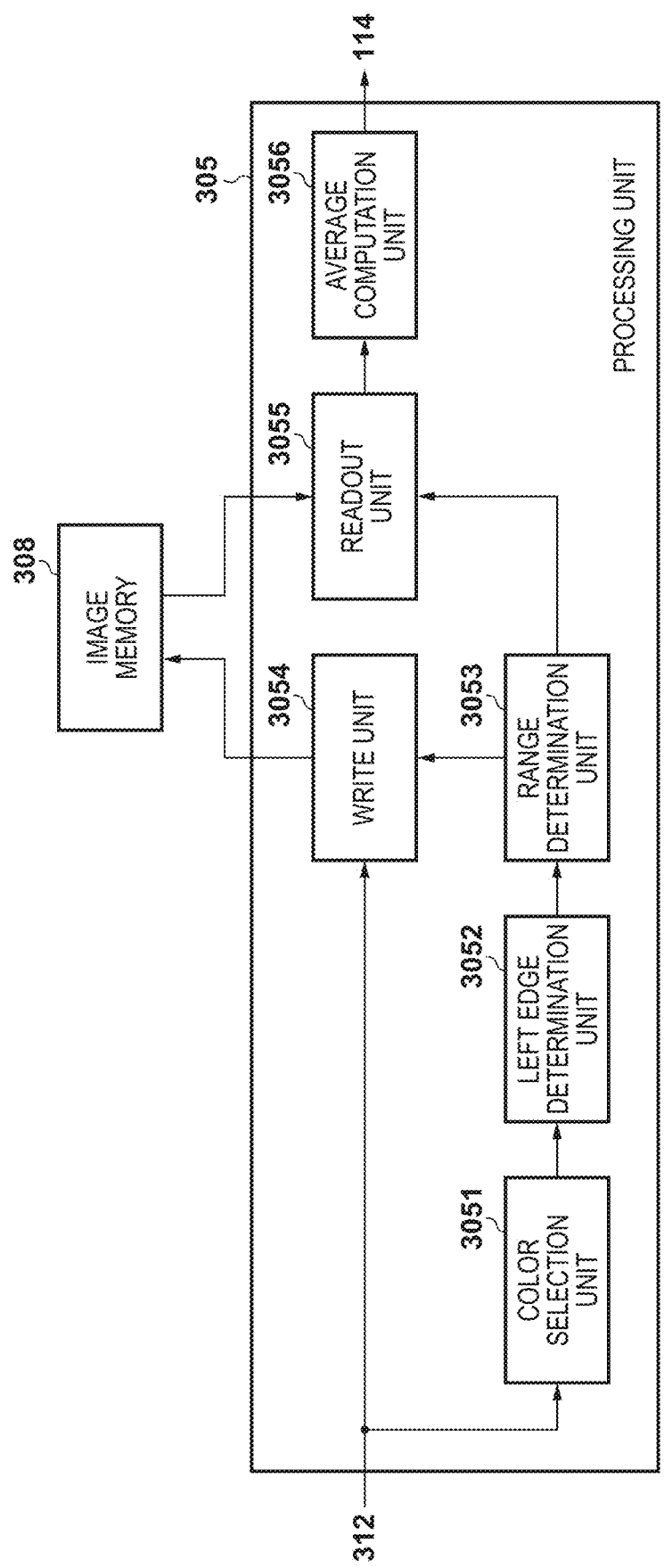
FIG. 9 is a configuration diagram of a processing unit according to some embodiments.

FIG. 9 is a block diagram of the processing unit 305 according to the present embodiment. A color selection unit 3051 selects any one of color component images corresponding to RGB included in read image data from the line sensor unit 312. In order to detect the adjustment patterns 608 with favorable accuracy, this color component selection can be made in accordance with a background color of the sheet (e.g., a color component that exhibits the largest color difference from the background color can be selected).

A left edge determination unit 3052 determines the position of the left edge of each image in an adjustment pattern 608 to be detected inside the read image of the color component selected by the color selection unit 3051. Here, the left edge refers to the left edge when facing toward the sheet conveyance direction. For example, the left edge determination unit 3052 may determine the left edge of each patch image in the adjustment pattern 608 by sequentially scanning the pixel values of each line in the read image and comparing each pixel value with a pre-defined threshold. In a case where the mask regions for the pattern formation regions 602 are white, the left edge of a patch image can be detected when the pixel value (or luminance value) falls below the threshold. In this way, the mask regions are provided to facilitate the detection of each patch image in the adjustment patterns 608. In the present embodiment, the search for each adjustment pattern 608 based on scanning of pixel values by the left edge determination unit 3052 can be made, for example, within a known search range such as a pattern formation region 602. Note that in order to improve the determination accuracy, the left edge determination unit 3052 may determine the positions of the left edges of patch images with use of a plurality of pixel values by simultaneously scanning the pixel values of a plurality of lines.

A range determination unit 3053 determines a range of each patch image to be cut out from the read image (hereinafter referred to as a cutout range) based on a determination result from the left edge determination unit 3052. The cutout range can be, for example, a central region of each patch image excluding the vicinities of four edges thereof. A write unit 3054 writes pieces of image data of the cutout ranges of the respective patch images determined by the range determination unit 3053 into the image memory 308. A readout unit 3055 reads out the pieces of image data written into the image memory 308, and outputs them to an average computation unit 3056.

The average computation unit 3056 calculates an average pixel value (RGB value) of the tones of each patch image based on the discrete pieces of image data input from the readout unit 3055. Then, the average computation unit 3056 outputs the calculated average pixel value to the CPU 114. The CPU 114 converts the average pixel value input from the processing unit 305 into the density of each patch image. Then, it generates a LUT based on the densities of the respective patch images and the target densities of the respective patch images.

As described above, the display mode of the pattern formation regions 602 on the preview screen in the case of the overlapping state is differentiated from the display mode of the pattern formation regions 602 on the preview screen in the case of the non-overlapping state. This configuration allows the user to easily confirm whether the user image does not overlap the adjustment patterns 608 on the screen before the print job is executed. In a case where they overlap, the user can change the user image, for example, the arrangement positions of the content images 603 so as to dissolve the overlapping state, for example. Also, the user can input a change in the arrangement positions of the adjustment patterns 608 to the control unit 1010 via the user IF unit 1011 so as to dissolve the overlapping state. As one example, the control unit 1010 displays, on the preview screen shown in FIG. 7, input objects for moving the respective pattern formation regions 602a to 602d on an individual basis. Note that the moving directions can be the left-right directions and/or the up-down directions of FIG. 7. The user can input the amounts of movements in the left-right directions and the up-down directions via the input objects. In accordance with the amounts of movements input to the input objects, the control unit 1010 displays the moved pattern formation regions 602 on the preview screen. Therefore, the user can dissolve the overlapping state by changing the amounts of movements input to the input objects while viewing the preview screen. Note that in a case where the range in which the arrangement positions of the pattern formation regions 602 can be changed has been determined in advance, the amounts of movements that can be input to the input objects are restricted so that they fall within the changeable range. In this way, by confirming whether the overlapping state is occurring before the print job is executed, a procedure for avoiding an overlap of the pattern formation regions 602 and the user image can be performed ahead of time. This can suppress a reduction in the accuracy of adjustment of an image forming condition caused by the formation of the user image inside the pattern formation regions 602 that include the adjustment patterns 608.

Note that although the entirety of the sheet is displayed on the preview screen of FIG. 6 and FIG. 7, it is permissible to adopt a configuration in which only the surrounding of a pattern formation region 602 is displayed. Also, although the display mode of the border lines indicating the pattern formation regions 602 is differentiated in the present embodiment, it is also possible to cause the display mode of the entire pattern formation regions 602 and the display mode of the adjustment patterns 608 to be different between the overlapping state and the non-overlapping state. For example, in the case of the non-overlapping state, the adjustment patterns 608 can be displayed as a preview in the same way as they are printed, whereas in the case of the overlapping state, an entirety or a part of an overlapping pattern formation region 602 can be displayed using a marker of a predetermined color. Furthermore, it is also possible to adopt a configuration in which the border lines indicating the pattern formation regions 602 are not displayed on the preview screen in the case of the non-overlapping state, and emphasized display is performed by displaying the border lines on the preview screen in the case of the overlapping state.

Also, in the present embodiment, the mask regions are provided around the adjustment patterns 608. The purpose thereof is to facilitate the detection of the adjustment patterns 608 as stated earlier. However, it is permissible to adopt a configuration in which the mask regions are not provided, and the regions of the adjustment patterns 608 are regarded as the pattern formation regions 602. In this case, in the overlapping state, the control unit 1010 causes the display mode of the adjustment patterns 608 to be different from that in the non-overlapping state. As one example, in the overlapping state, the control unit 1010 can display lines surrounding the adjustment patterns 608, display the adjustment patterns 608 using markers, or cause the colors and line type (thickness, color, etc.) of the adjustment patterns 608 to be different from the colors and line type that are printed. Note that in the case of the non-overlapping state, the adjustment patterns 608 are displayed in a form in which they are printed.

Furthermore, in the present embodiment, it is assumed that the preview screen is displayed when the user has pressed the preview button B503 on the print setting screen shown in FIG. 5. However, the control unit 1010 can determine whether the overlapping state is occurring in a case where the user has input the intension to execute the adjustment control by operating the checkboxes B501 and B502. Therefore, for example, the control unit 1010 can be configured to, in a case where it has determined that the overlapping state is occurring when the execution of the adjustment control has been input, execute processing for causing the user to recognize the overlapping state even if the preview button B503 is not pressed via a user operation. The processing for causing the user to recognize the overlapping state can be, for example, processing for displaying the preview screen even if the preview button B503 is not pressed. Furthermore, the processing for causing the user to recognize the overlapping state can be, for example, processing for displaying an object that requests the user to display and confirm the preview screen or an object indicating the overlapping state on the print setting screen. The processing for causing the user to recognize the overlapping state can be executed when the user has input the intention to execute the adjustment control and pressed the enter button B505, rather than when the user has input the intention to execute the adjustment control by operating the checkboxes B501 and B502. Also, in the case of the overlapping state, it is also possible to make the enter button B505 inoperable by placing it in a grayed-out state. In addition, the execution of the processing for causing the user to recognize the overlapping state can be triggered by the user's execution of an operation of transmitting a print job to the image forming apparatus 100. In this case, the control unit 1010 can execute the processing for causing the user to recognize the overlapping state without transmitting the print job to the image forming apparatus 100. Moreover, the processing for causing the user to recognize the overlapping state can be executed by, for example, outputting a warning sound or audio in addition to display on the screen, or in place of display on the image.

Furthermore, in the present embodiment, it is assumed that the data for forming the adjustment patterns 608 on a sheet is stored in the storage unit 1012 in advance. However, for example, it is permissible to adopt a configuration in which, when the user has input the intention to execute the adjustment control by operating the checkboxes B501 and B502 shown in FIG. 5, the control unit 1010 obtains the data for forming the adjustment patterns 608 on a sheet from the image forming apparatus 100 and stores the data into the storage unit 1012.

As described above, upon detecting the overlapping state, the control unit 1010 executes processing for displaying a notification indicating the overlapping state. For example, the control unit 1010 can perform this display on the preview screen. Also, the control unit 1010 can perform this display upon the execution of a user input for selecting the execution of the adjustment control, a user input for finalizing the execution of the adjustment control, or a user input for transmitting a print job that accompanies the adjustment control to the image forming apparatus.

Second Embodiment

Next, a second embodiment will be described with a focus on the differences from the first embodiment. According to the first embodiment, in the case of the overlapping state, the display mode of the pattern formation regions 602 is differentiated from that in the case of the non-overlapping state. According to the present embodiment, the display mode of the user image, for example, the content images 603 is differentiated.

Figure 10:
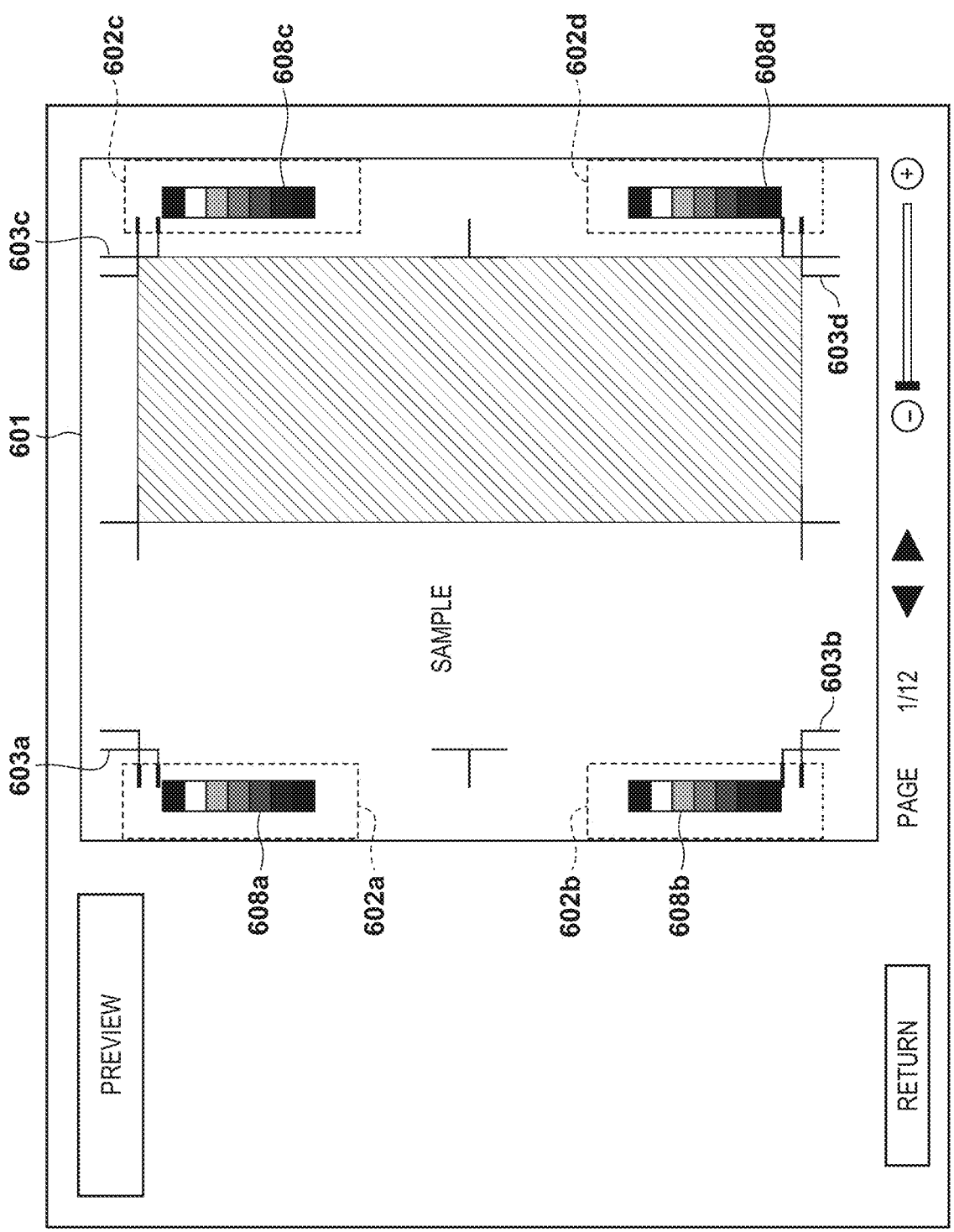
FIG. 10 is a diagram showing an example of a preview screen according to some embodiments.

FIG. 10 shows a preview screen that is displayed in the case of the overlapping state in the present embodiment. Note that the preview screen in the case of the non-overlapping state is as shown in FIG. 6, for example. In the present embodiment, emphasized displayed is performed by causing the display mode of a part of the content images 603 that overlaps the pattern formation regions 602 to be different from the display mode of this part in the case of the non-overlapping state. For example, in the case of the non-overlapping state, the control unit 1010 displays the user image as a preview in the same way as it is printed. On the other hand, the control unit 1010 can be configured so that, in the case of the overlapping state, emphasized display is performed by changing the color or size of a part of the user image that overlaps the pattern formation regions 602. As another example, the control unit 1010 can be configured so that, in the case of the overlapping state, the color of the regions including a part of the content images 603 that overlaps the pattern formation regions 602 is changed from the color to be printed, or border lines surrounding these regions are displayed. Note that although only a part of the content images 603 that overlaps the pattern formation regions 602 is displayed with emphasis in FIG. 10, the entire content images 603 that include the overlapping part may be displayed with emphasis. Furthermore, it is permissible to adopt a configuration in which the pattern formation regions 602 are also displayed with emphasis, similarly to the first embodiment.

As described above, the present embodiment can also cause the user to recognize the state where the user image is formed in the pattern formation regions 602. Therefore, the user can perform a procedure for preventing the user image from being formed inside the pattern formation regions 602 ahead of time.

Third Embodiment

Next, a third embodiment will be described with a focus on the differences from the first embodiment and the second embodiment. According to the first embodiment and the second embodiment, in the case of the overlapping state, the display mode of the pattern formation regions 602 and the user image is differentiated from that in the case of the non-overlapping state. According to the present embodiment, in the case of the overlapping state, an object indicating the overlapping state is displayed on the preview screen.

Figure 11:
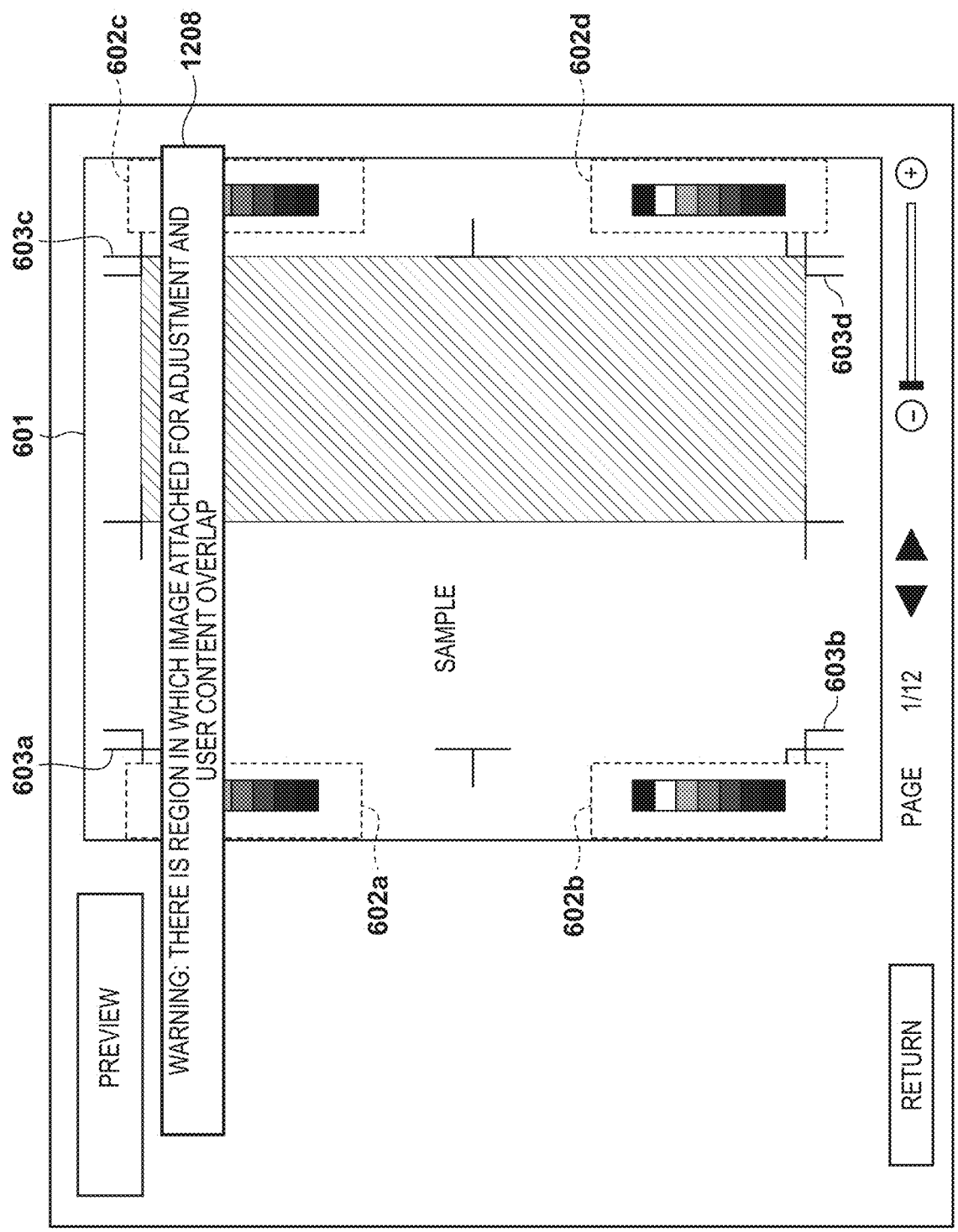
FIG. 11 is a diagram showing an example of a preview screen according to some embodiments.

FIG. 11 shows an example of a preview screen that is displayed in the case of the overlapping state in the present embodiment. Note that in the case of the non-overlapping state, for example, the preview screen shown in FIG. 6 is displayed. As shown in FIG. 11, according to the present embodiment, the control unit 1010 displays an object 1208 on the preview screen in the case of the overlapping state. In the example of FIG. 11, the object 1208 includes a warning sentence indicating the overlapping state. Note that it is permissible to adopt a configuration in which, when there is a page that is in the overlapping state, the object 1208 is displayed regardless of a page displayed on the preview screen. Also, it is permissible to adopt a configuration in which the object 1208 is displayed only on the preview screen that displays the page that is in the overlapping state.

Note that it is permissible to adopt a configuration in which the object 1208 is displayed on the preview screen in both of the overlapping state and the non-overlapping state, but the display mode thereof is differentiated between the overlapping state and the non-overlapping state. For example, it is permissible to adopt a configuration that, in the case of the non-overlapping state, displays an object 1208 including characters indicating the non-overlapping state so that it does not overlap the preview display area 601. Also, it is permissible to adopt a configuration that, in the case of the overlapping state, the object 1208 including characters indicating the overlapping state is displayed while overlapping the preview display area 601 as shown in FIG. 11.

As described above, the present embodiment can also cause the user to recognize the state where the user image is formed in the pattern formation regions 602. Therefore, the user can perform a procedure for preventing the user image from being formed inside the pattern formation regions 602 ahead of time.

Fourth Embodiment

Next, a fourth embodiment will be described with a focus on the differences from the first embodiment to the third embodiment. In the present embodiment, when the overlapping state has been detected, the control unit 1010 determines whether the adjustment patterns 608 (pattern formation regions 602) can be moved so as to achieve the non-overlapping state, and in a case where they can be moved, displays the preview screen on which they have been moved.

Figure 12:
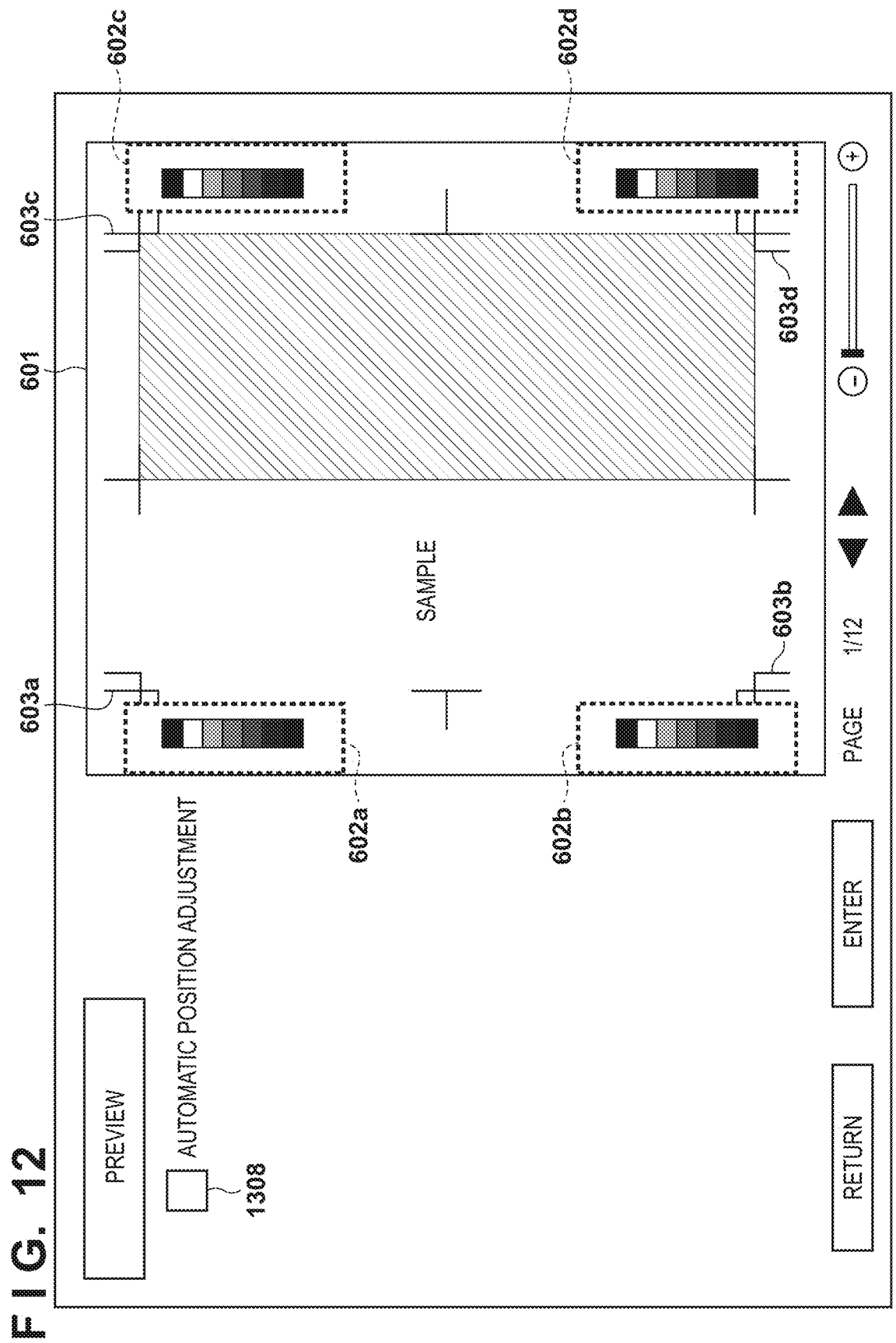
FIG. 12 is a diagram showing an example of a preview screen according to some embodiments.

FIG. 12 shows an example of a preview screen according to the present embodiment. As shown in FIG. 12, a part of the content images 603 is arranged inside the pattern formation regions 602. In the present embodiment, the preview screen displays a mode setting checkbox 1308. The user can set an automatic adjustment mode to be on by checking the mode setting checkbox 1308. Also, the user can set the automatic adjustment mode to be off by unchecking the mode setting checkbox 1308. In FIG. 12, the automatic adjustment mode is off. The preview screen in this case is similar to that in the case of the overlapping state according to one of the first embodiment to the third embodiment.

Figure 13:
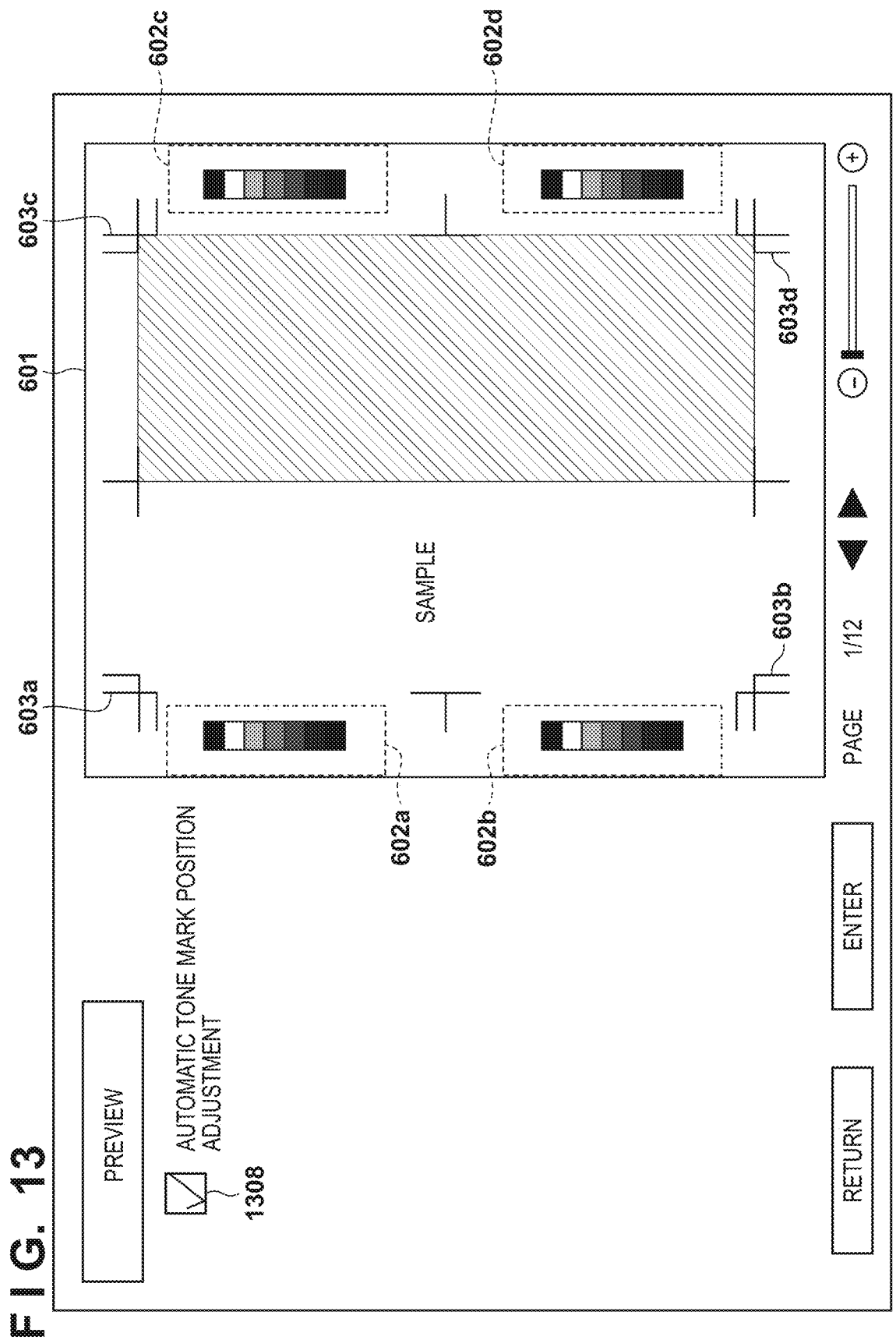
FIG. 13 is a diagram showing an example of a preview screen according to some embodiments.

FIG. 13 shows an example of a preview screen that is displayed in a case where the automatic adjustment mode is on, or in a case where the automatic adjustment mode has been changed to on from the state of FIG. 12. As shown in FIG. 13, the adjustment patterns 608 (and hence the pattern formation regions 602 as well) are moved in the up-down directions of the figure, and consequently, the non-overlapping state is achieved.

Figure 14:
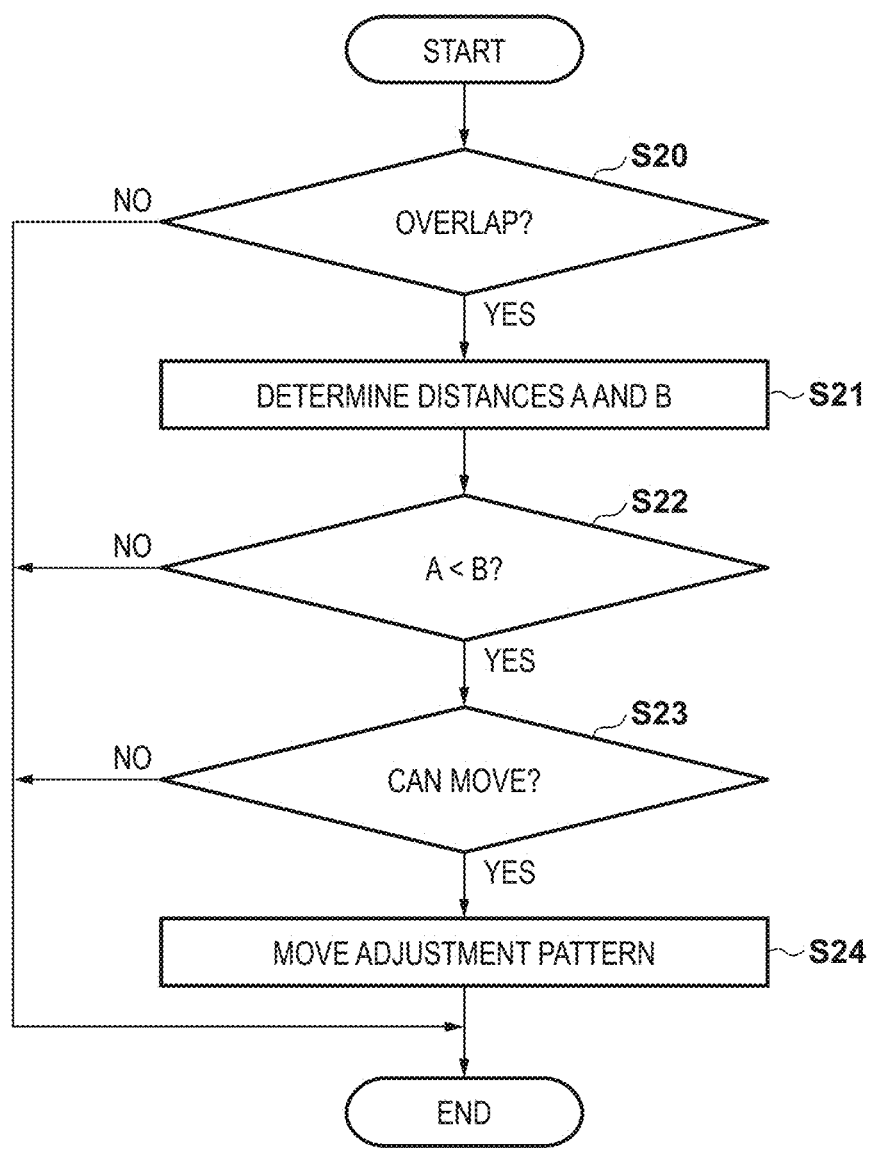
FIG. 14 is a flowchart of processing for moving adjustment patterns according to some embodiments.

FIG. 14 is a flowchart of processing for moving the adjustment patterns 608 that is executed by the control unit 1010 in a case where the automatic adjustment mode is on. In step S20, the control unit 1010 determines whether the overlapping state is occurring. In a case where the overlapping state is not occurring, the control unit 1010 ends the processing of FIG. 14. In the case of the overlapping state, the control unit 1010 determines a distance A and a distance B shown in FIG. 15.

In the present embodiment, it is assumed that a pattern formation region 602 can be moved from a reference position (initial position) thereof within a range equal to or smaller than the distance B in the sheet conveyance direction or the diction opposite thereto (the direction toward a lower side of the figure). For example, in the example of FIG. 13, it is assumed that the pattern formation regions 602*a* and 602*c* can be moved in the direction opposite to the conveyance direction, whereas the pattern formation regions 602*b* and 602*d* can be moved in the conveyance direction. In the following description, the direction in which the pattern formation region 602*a* can be moved will be referred to as a movable direction.

Figure 15:
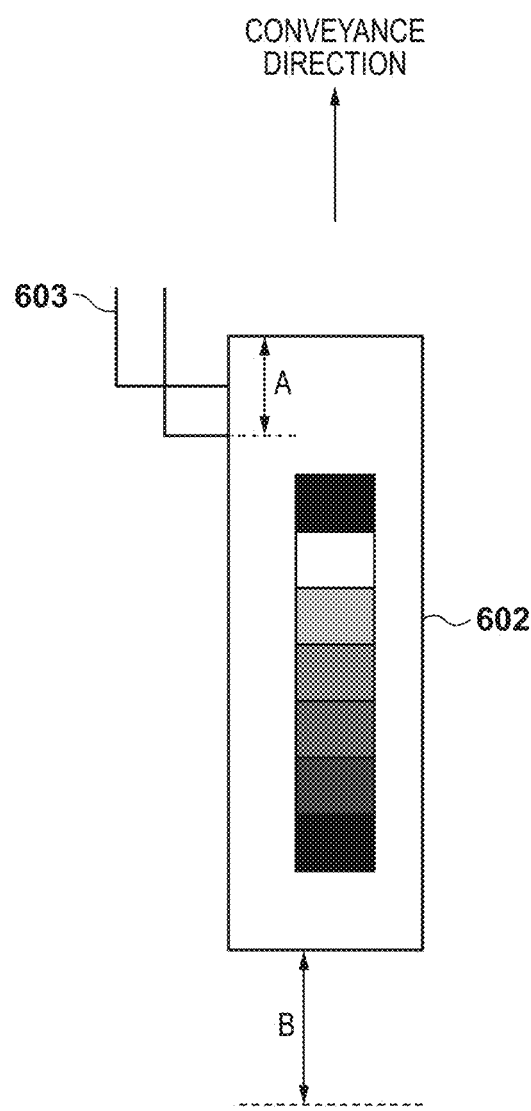
FIG. 15 is a diagram illustrating processing for moving adjustment patterns.

A pattern formation region 602 of FIG. 15 indicates a state where it is arranged at the reference position. Note, it is assumed that the movable direction of the pattern formation region 602 of FIG. 15 is the direction opposite to the conveyance direction. The distance A of FIG. 15 is a distance between the most upstream position of the pattern formation region 602 in the movable direction and the most downstream position of an overlapping content image 603 in the movable direction. As apparent from FIG. 15, if the distance B is not larger than the distance A, the overlapping state cannot be dissolved. For this reason, the control unit 1010 determines whether the distance B is larger than the distance A in step S22. In a case where the distance B is not larger than the distance A, the control unit 1010 ends the processing of FIG. 14. In this case, the control unit 1010 can be configured to notify the user of, for example, the overlapping state or the fact that the overlapping state cannot be dissolved automatically.

In a case where the distance B is larger than the distance A, the control unit 1010 determines whether the pattern formation region 602 can be moved within a range of the distance A to the distance B in the movable direction in step S23. For example, in a case where the pattern formation region 602 newly overlaps another part of the user image when moved by the distance A to the distance B in the movable direction, the control unit 1010 determines that the pattern formation region 602 cannot be moved in step S23. If the control unit 1010 has determined that the pattern formation region cannot be moved in step S23, it ends the processing of FIG. 14. In this case, the control unit 1010 can be configured to notify the user of, for example, the overlapping state or the fact that the overlapping state cannot be dissolved automatically.

If the control unit 1010 has determined that the pattern formation region can be moved in step S23, it moves the adjustment pattern 608 (pattern formation region 602) and displays the preview screen after the adjustment pattern 608 has been moved as shown in, for example, FIG. 13 in step S24. In a case where the user who has confirmed the preview screen shown in FIG. 13 transmits a print job by operating the host computer 101, the control unit 1010 transmits image data of an image that includes the user image and the moved adjustment pattern 608 to the image forming apparatus 100. Also, the control unit 1010 can be configured to notify the image forming apparatus 100 of information indicating the position of the moved adjustment pattern 608. In this case, the processing unit 305 of the image forming apparatus 100 detects the adjustment pattern 608 in accordance with the formation position of the moved adjustment pattern 608.

Note that although it is assumed in the present embodiment that the pattern formation regions 602 can be moved from the reference positions thereof only in one direction, it is permissible to adopt a configuration in which they can be moved in both of the sheet conveyance direction and the direction opposite thereto. Furthermore, it is permissible to adopt a configuration in which the pattern formation regions 602 can be moved from the reference positions thereof in the main scanning direction. In summary, the reference positions and movable ranges are set for the pattern formation regions 602. Initially, the control unit 1010 determines whether the overlapping state is occurring under the assumption that the pattern formation regions 602 are formed at the reference positions. When the overlapping state has been detected in a case where the automatic adjustment mode is on, the control unit 1010 determines whether the non-overlapping state can be achieved by moving the pattern formation regions 602 in the movable ranges. In a case where the non-overlapping state can be achieved, the control unit 1010 moves the pattern formation regions 602 and displays the preview screen. On the other hand, in a case where the non-overlapping state cannot be achieved, the control unit 1010 notifies the user of the fact that the non-overlapping state cannot be automatically achieved, for example. In a case where the control unit 1010 has moved the pattern formation regions 602 from the reference positions, it can notify the controller 110 of information indicating the positions of the moved pattern formation regions 602. Note that the data of the adjustment patterns 608 stored in the storage unit 1012 of the host computer 101 includes information indicating the above-described reference positions and movable ranges. Also, it is permissible to adopt a configuration in which the control unit 1010 obtains information indicating the reference positions and the movable ranges from the controller 110 when the preview screen is displayed or when the automatic adjustment mode has been changed to on. Furthermore, although the automatic adjustment mode is set to be on or off on the preview screen in the present embodiment, it is permissible to adopt a configuration in which the automatic adjustment mode are set to be on or off on another screen such as the print setting screen of FIG. 5, for example. In addition, it is permissible to adopt a mode in which the control unit 1010 is configured to perform the automatic adjustment constantly. In this case, when the non-overlapping state cannot be achieved by the automatic adjustment, the control unit 1010 can display a notification indicating the overlapping state.

As described above, the frequency of the occurrence of the overlapping state can be reduced by adjusting the formation positions of the adjustment patterns 608 on a sheet in accordance with the user image. This can suppress a reduction in the accuracy of adjustment of an image forming condition caused by the formation of the user image inside the pattern formation regions 602 that include the adjustment patterns 608.

Fifth Embodiment

According to the first embodiment to the fourth embodiment, data for forming the adjustment patterns 608 on a sheet is stored in the storage unit 1012 of the host computer 101 in advance, or obtained by the control unit 1010 of the host computer 101 from the image forming apparatus 100. Also, when image formation that accompanies the adjustment control is to be performed, the control unit 1010 of the host computer 101 transmits image data of an image obtained by compositing the user image (including the content images) and the adjustment patterns to the image forming apparatus 100.

The present embodiment differs from the first embodiment to the fourth embodiment in that, when image formation that accompanies the adjustment control is to be performed, the control unit 1010 of the host computer 101 transmits information indicating the type of the adjustment control and image data of the user image (including the content images) to the image forming apparatus 100. Therefore, the controller 110 of the image forming apparatus 100 performs image formation by generating image data of an image obtained by compositing the user image and the adjustment patterns based on image data of the user image (including the content images) received from the host computer 101. Data of the adjustment patterns is stored in, for example, the HDD 115 of the controller 110. Note that in the present embodiment, too, the host computer 101 determines whether the overlapping state is occurring, provides a notification to a user in the case of the overlapping state, and so forth.

In this configuration, in a case where the formation positions of the adjustment patterns 608 have been adjusted on the host computer 101 to dissolve the overlapping state, the host computer 101 notifies the image forming apparatus 100 of the adjusted positions of the adjustment patterns 608.

When generating image data of an image obtained by compositing the user image and the adjustment patterns, the controller 110 can determine whether the overlapping state is occurring. For example, the user could possibly transmit a print job, while still in the overlapping state, without conforming the preview screen on the host computer 101. When the controller 110 has detected the overlapping state when generating image data of an image obtained by compositing the user image and the adjustment patterns, it can execute processing for causing the user to recognize the overlapping state without performing image formation. For example, the controller 110 can notify the control unit 1010 of the host computer 101 of the overlapping state. In this case, in response to this notification, the control unit 1010 can display the preview screen, display an object for prompting confirmation of the preview screen, and display an object indicating that the adjustment patterns and the user image overlap on the display of the user IF unit 1011.

Note that it is permissible to adopt a configuration in which data of the adjustment patterns 608 is not stored in the storage unit 1012 of the host computer 101 in advance, and thus the control unit 1010 of the host computer 101 does not determine whether the overlapping state is occurring before a print job is transmitted. In this case, the controller 110 determines whether the overlapping state is occurring when generating image data of an image obtained by compositing the user image and the adjustment patterns. Then, in the case of the overlapping state, the controller 110 transmits data of the adjustment patterns 608 to the host computer 101 without performing image formation, and also provides the host computer 101 with a notification indicating the overlapping state. The host computer 101 can be configured to, upon receiving the notification indicating the overlapping state, display the preview screen and the like based on the received data of the adjustment patterns 608, and cause the user to change the positions of the adjustment patterns 608 and the position of the user image.

OTHERS

In the first embodiment to the fifth embodiment, the host computer 101, which is an information processing apparatus, performs control to display the preview screen. That is to say, the control unit 1010 of the host computer 101 determines whether the overlapping state is occurring, and moves the pattern formation regions 602 in a case where the automatic adjustment mode is on. However, it is permissible to adopt a configuration in which the controller 110 of the image forming apparatus 100 executes the processing that has been described to be executed by the control unit 1010 of the host computer 101 in the first embodiment to the fifth embodiment. For example, in a case where images are formed based on the user image stored in the HDD 115, the controller 110 displays the setting screen and the preview screen on the operation panel 120. Then, in the case of the overlapping state, the controller 110 displays a notification indicating the overlapping state on the operation panel 120, and moves the adjustment patterns 608 so as to dissolve the overlapping state, as has been described in the first embodiment to the fourth embodiment.

Furthermore, the controller 110 may be configured to control a preview screen displayed on the host computer 101 as well. For example, it is permissible to adopt a configuration in which the host computer 101 transmits image data of a user image to be processed to the controller 110, and the controller 110 generates a preview screen to be displayed on the display of the host computer 101 and displays the preview screen on the display of the host computer 101. In this case, the controller 110 determines whether the overlapping state is occurring and moves the pattern formation regions 602 in a case where the automatic adjustment mode is on.

OTHER EMBODIMENTS

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-116093, which was filed on Jul. 14, 2023 and which is hereby incorporated by reference herein in its entirety.

What is claimed is:

1. An image forming system, comprising:
   an image forming unit configured to form an image on a sheet;
   a reader configured to optically read the sheet on which the image has been formed by the image forming unit, and output read image data indicating a read image;
   a display;
   at least one memory storing instructions; and
   one or more processors configured to execute the instructions,
   wherein, based on image data, the image forming unit forms a user image and an adjustment pattern for adjusting an image forming condition, wherein the user image includes a region inside trimming positions of the sheet and includes a content image outside the trimming positions, and wherein the adjustment pattern is outside the trimming positions, and
   wherein execution of the instructions causes the one or more processors to:
   adjust the image forming condition at a time of image formation by the image forming unit, and in a case where a formation region of the content image and at least a part of a formation region of the adjustment pattern overlap, control the display to display information indicating that the formation region of the content image and the formation region of the adjustment pattern overlap.

2. The image forming system according to claim 1, wherein execution of the instructions further causes the one or more processors to:
perform control to display, on the display, a preview screen of the image that is formed on the sheet by the image forming unit, and, in a case where the formation region of the content image and the at least part of the formation region of the adjustment pattern overlap, display, on the preview screen, information indicating that the formation region of the content image and the formation region of the adjustment pattern overlap.

3. The image forming system according to claim 2, wherein execution of the instructions further causes the one or more processors to:
in a case where the formation region of the content image and the at least part of the formation region of the adjustment pattern overlap, perform control to display the preview screen regardless of a user operation, or display an object for requesting an operation of displaying the preview screen to be performed on the display.

4. The image forming system according to claim 2, wherein execution of the instructions further causes the one or more processors to:
in a case where the formation region of the content image and the at least a part of the formation region of the adjustment pattern overlap, cause a display mode of the adjustment pattern or the content image on the preview screen to be different from a display mode of the adjustment pattern or the content image on the preview screen in a case where the formation region of the content image and the formation region of the adjustment pattern do not overlap.

5. The image forming system according to claim 4, wherein execution of the instructions further causes the one or more processors to:
in a case where the formation region of the content image and the at least part of the formation region of the adjustment pattern overlap, cause a display mode of a part of the content image formed inside the formation region of the content image on the preview screen to be different from a display mode of the part of the content image on the preview screen in a case where the formation region of the content image and the formation region of the adjustment pattern do not overlap.

6. The image forming system according to claim 2, wherein execution of the instructions further causes the one or more processors to:
display a border line indicating the formation region of the adjustment pattern on the preview screen, and, in a case where the formation region of the content image and the at least a part of the formation region of the adjustment pattern overlap, cause a display mode of the border line on the preview screen to be different from the display mode of the border line in a case where the formation region of the content image and the formation region of the adjustment pattern do not overlap.

7. The image forming system according to claim 2, wherein execution of the instructions further causes the one or more processors to:
display a border line indicating the formation region of the adjustment pattern on the preview screen in a case where the formation region of the content image and the at least a part of the formation region of the adjustment pattern overlap, and not display the border line indicating the formation region of the adjustment pattern on the preview screen in a case where the formation region of the content image and the formation region of the adjustment pattern do not overlap.

8. The image forming system according to claim 2, wherein execution of the instructions further causes the one or more processors to:
in a case where the formation region of the content image and the at least part of the formation region of the adjustment pattern overlap, display an object indicating that the formation region of the content image and the formation region of the adjustment pattern overlap on the preview screen, and in a case where the formation region of the content image and the formation region of the adjustment pattern do not overlap, not display the object on the preview screen.

9. The image forming system according to claim 2, wherein execution of the instructions further causes the one or more processors to:
in a case where the formation region of the content image and the at least a part of the formation region of the adjustment pattern overlap, display an object indicating that the formation region of the content image and the formation region of the adjustment pattern overlap on the preview screen, and, in a case where the formation region of the content image and the formation region of the adjustment pattern do not overlap, display an object indicating that the formation region of the content image and the formation region of the adjustment pattern do not overlap on the preview screen.

10. The image forming system according to claim 2, wherein execution of the instructions further causes the one or more processors to:
upon detecting an overlap between the formation region of the content image and the at least a part of the formation region of the adjustment pattern in a case where an automatic adjustment mode has been set, determine whether the formation region of the adjustment pattern can be moved so that the formation region of the content image and the formation region of the adjustment pattern do not overlap, and, in a case where the formation region of the adjustment pattern has been determined to be movable, move the formation region of the adjustment pattern so that the formation region of the content image and the formation region of the adjustment pattern do not overlap, and display the preview screen on the display.

11. The image forming system according to claim 10, wherein a movable range in which the formation region of the adjustment pattern can be moved is set, and
wherein execution of the instructions further causes the one or more processors to, upon detecting an overlap between the formation region of the content image and the at least part of the formation region of the adjustment pattern in a case where the automatic adjustment mode has been set, determine whether the formation region of the adjustment pattern can be moved in the movable range so that the formation region of the content image and the formation region of the adjustment pattern do not overlap.

12. The image forming system according to claim 1, wherein the formation region of the adjustment pattern includes a region in which the adjustment pattern is formed, and a blank region which surrounds the adjustment pattern and in which no image is formed.

13. The image forming system according to claim 1, wherein
the image forming condition adjusted by the adjustment pattern is a condition related to a density of the image formed by the image forming unit.

14. The image forming system according to claim 1, wherein
the image forming condition adjusted by the adjustment pattern is a condition related to a position of the image formed by the image forming unit.

15. An image forming system, comprising:
an image forming unit configured to form an image on a sheet;
a reader configured to optically read the sheet on which the image has been formed by the image forming unit, and output read image data indicating a read image;
at least one memory storing instructions; and
one or more processors configured to execute the instructions,
wherein, based on image data, the image forming unit forms a user image and an adjustment pattern for adjusting an image forming condition, wherein the user image includes a region inside trimming positions of the sheet and includes a content image outside the trimming positions, and wherein the adjustment pattern is outside the trimming positions, and
wherein execution of the instructions causes the one or more processors to:
adjust the image forming condition at a time of image formation by the image forming unit, and
in a case where a formation region of the content image and at least a part of a formation region of the adjustment pattern overlap, determine whether the formation region of the adjustment pattern can be moved so that the formation region of the content image and the formation region of the adjustment pattern do not overlap, and, in a case where the formation region of the adjustment pattern has been determined to be movable, move the formation region of the adjustment pattern so that the formation region of the content image and the formation region of the adjustment pattern do not overlap.

16. The image forming system according to claim 15, wherein execution of the instructions further causes the one or more processors to:
in a case where the formation region of the adjustment pattern cannot be moved so that the formation region of the content image and the formation region of the adjustment pattern do not overlap, perform control to display, on a display, information indicating that the formation region of the content image and the formation region of the adjustment pattern overlap.

* * * * *